(12) United States Patent
Bostrom et al.

(10) Patent No.: US 7,506,932 B2
(45) Date of Patent: Mar. 24, 2009

(54) ADJUSTABLE JOCKEY SEAT ASSEMBLY

(75) Inventors: John M. Bostrom, Waterford, WI (US); Wayne R. Block, South Milwaukee, WI (US); Ryan Hummer, Waukesha, WI (US)

(73) Assignee: H.O. Bostrom Company, Inc., Waukesha, WI (US)

( * ) Notice: Subject to any disclaimer, the term of this patent is extended or adjusted under 35 U.S.C. 154(b) by 0 days.

(21) Appl. No.: 11/755,876

(22) Filed: May 31, 2007

(65) Prior Publication Data

US 2008/0296940 A1    Dec. 4, 2008

(51) Int. Cl.
  *B60N 2/38* (2006.01)
  *B60N 2/39* (2006.01)
  *B60N 2/40* (2006.01)
  *B62J 1/00* (2006.01)
  *F16M 13/00* (2006.01)

(52) U.S. Cl. .............. 297/344.15; 297/195.1; 297/195.11; 297/452.25; 248/421

(58) Field of Classification Search ............ 297/344.15, 297/195.1, 195.11, 312, 452.25; 248/421
See application file for complete search history.

(56) References Cited

U.S. PATENT DOCUMENTS

| | | | | |
|---|---|---|---|---|
| 2,527,905 A | * | 10/1950 | Barecki | 297/344.15 X |
| 2,638,290 A | * | 5/1953 | LeCarme | 297/312 X |
| 3,623,766 A | | 11/1971 | Funk | |
| 4,125,242 A | * | 11/1978 | Meiller et al. | 248/421 X |
| 4,286,765 A | * | 9/1981 | Delgleize et al. | 297/344.15 X |
| 4,856,763 A | * | 8/1989 | Brodersen et al. | 267/131 |

(Continued)

FOREIGN PATENT DOCUMENTS

WO    96/13423    5/1996

(Continued)

OTHER PUBLICATIONS http://www.zodiacmilpro.com/access/smsseat.html, last visited Oct. 27, 2006.

(Continued)

*Primary Examiner*—Rodney B. White
(74) *Attorney, Agent, or Firm*—Andrus, Sceales, Starke & Sawall, LLP (57) ABSTRACT

A jockey seat assembly is adapted to be used on a motorized vehicle and includes a saddle seat having a substantially inverted U-shaped configuration. A height adjusting mechanism is provided for the seat and has an upper frame mounted beneath the saddle seat, a lower frame adapted to be secured to a bottom surface of the vehicle and a collapsible lever assembly interconnected between the upper and lower frames. A biasing arrangement is secured between outermost ends of the lever assembly in the upper frame and the lower frame for urging the upper frame and the seat away from the lower frame. A pair of adjustment plates are fixed externally to the lever assembly and provided with a series of slots defining a number of vertical height adjusting positions. An actuator extends forwardly of the seat and the upper frame and is pivotally connected to the upper frame. The actuator has a pair of links normally biased into engagement with the slots for normally establishing a desired vertical height adjustment for the seat relative to the lower frame upon pivotal movement of the actuator. The jockey seat assembly may optionally include a pair of adjustable leg supports, a pair of handlebars and a backrest for further support.

18 Claims, 5 Drawing Sheets

U.S. PATENT DOCUMENTS

| | | | |
|---|---|---|---|
| 4,879,963 A | | 11/1989 | Dionne |
| 4,880,201 A | * | 11/1989 | Hall et al. ............ 297/344.15 X |
| 4,943,037 A | * | 7/1990 | Brodersen et al. ....... 248/421 X |
| 5,039,054 A | * | 8/1991 | Pai ...................... 297/344.15 X |
| 5,125,631 A | | 6/1992 | Brodersen et al. |
| 5,237,950 A | | 8/1993 | Abe et al. |
| 5,367,978 A | | 11/1994 | Mardikian |
| 5,447,116 A | | 9/1995 | Kobayashi |
| 5,619,949 A | | 4/1997 | Dick, Jr. |
| 5,676,424 A | * | 10/1997 | Winkelhake ........ 297/344.15 X |
| 5,765,802 A | | 6/1998 | Bostrom et al. |
| 5,927,679 A | * | 7/1999 | Hill .................... 297/344.15 X |
| 5,957,426 A | * | 9/1999 | Brodersen ............... 248/588 X |
| 6,098,567 A | | 8/2000 | Ullman |
| 6,378,947 B1 | * | 4/2002 | Barber et al. ....... 297/452.25 X |
| 6,554,359 B2 | * | 4/2003 | Kohl et al. .......... 297/344.15 X |
| 6,616,116 B1 | * | 9/2003 | Rochau et al. .......... 248/421 X |
| 6,935,693 B2 | * | 8/2005 | Janscha et al. ......... 297/344.15 |
| 6,966,598 B2 | * | 11/2005 | Schmale ............. 297/344.15 X |
| 2003/0218370 A1 | | 11/2003 | Langham |
| 2005/0145158 A1 | | 7/2005 | Boudeau et al. |

FOREIGN PATENT DOCUMENTS

WO        2005/005242        1/2005

OTHER PUBLICATIONS

International Search Report mailed May 8, 2008.

* cited by examiner

ADJUSTABLE JOCKEY SEAT ASSEMBLY

FIELD OF THE INVENTION

The present invention relates generally to vehicle seat structure and, more particularly, pertains to a jockey seat assembly designed for marine application.

BACKGROUND OF THE INVENTION

Jockey or saddle seats are known to be used in high-speed reinforced inflatable patrol boats that may be launched from larger operational marine crafts such as Coast Guard vessels. Occupants of such boats are subject to violent and unpredictable rocking, rolling, heaving, jerks and vibrations as they sit or stand straddling the seat. Bouncing on waves at high speeds can lead to injury and fatigue of boat operators and passengers in extreme conditions. As a result, jockey seats are typically provided with suspension pedestals or other shock absorbing systems that give the occupants body protection against vertical accelerations associated with high-speed marine craft. Jockey seats may also be designed with backrests or handlebars to provide further support and stability at the front and rear of the seat occupant.

The positioning of a seat prompts the seat occupant to stand on the balls of the feet in a knees-bent defensive position which offers natural protection against fatigue and injury. Height adjustment of the seat is important to people with different leg lengths so the legs may continue to take up the forceful shocks incurred during high-speed boat operation regardless of the available shock absorbing capability of the seat.

It is desirable to provide a jockey seat assembly having a reliable, easily operated height adjustment mechanism which offers a range of vertical positions and is corrosion resistant for the marine environment. It is also desirable to provide a jockey seat assembly with enhanced adjustable leg and thigh supports laterally of the seat. It is further desirable to provide additional support structure which is conveniently incorporated into the front and rear ends of the jockey seat assembly.

SUMMARY OF THE INVENTION

It is one object of the present invention to provide a jockey seat assembly equipped with a lever-type, spring assisted height adjustment mechanism.

It is also an object of the present invention to provide a jockey seat assembly with a pair of optional adjustable leg supports laterally of and at a rear end of the seat.

It is a further object of the present invention to provide a jockey seat assembly with a pair of optional handlebars at the front end of the seat.

It is another object of the present invention to provide a jockey seat assembly with an optional backrest at the rear end of the seat.

The present invention relates to a jockey seat assembly adapted to be used on a motorized vehicle. The jockey seat assembly includes a saddle seat having a substantially inverted U-shaped configuration. A height adjustment mechanism for the seat has an upper frame mounted beneath the saddle seat, a lower frame adapted to be secured to a bottom surface of the vehicle, and a collapsible lever assembly interconnected between the upper and lower frames. A biasing arrangement is secured between outermost ends of the lever assembly in the upper frame and the lower frame for urging the upper frame and the seat away from the lower frame. A pair of adjustment plates are fixed externally to the lever assembly and provided with a series of slots defining a number of vertical height adjusting positions. An actuator extends forwardly of the seat and the upper frame, and is pivotally connected to the upper frame. The actuator has a pair of links normally biased into engagement with the slots for selectively establishing a desired vertical height adjustment for the seat relative to the lower frame upon pivotal movement of the actuator.

The upper frame and the lower frame each include a pair of side channels. The lever assembly includes a pair of outer levers and a pair of inner levers. A mid-portion of each of the outer levers is pivotally connected to a mid-portion of the inner levers. Outermost ends of the outer levers are joined by a rear cross shaft and a front cross shaft. Outermost ends of the inner levers are interconnected by a rear cross shaft and a front cross shaft. The biasing arrangement includes a first coil spring secured between the rear cross shaft of the outer levers and the front cross shaft of the inner levers. The biasing arrangement includes a second coil spring connected between the rear cross shaft of the inner levers and the front cross shaft of the outer levers. The rear cross shaft of the outer levers carries a first set of slide blocks that are slidably received in a rear end of the upper frame. The rear cross shaft of the inner levers carries a second set of slide blocks slidably received in a rear end of the lower frame. The front cross shaft of the outer levers carries a first set of stationary blocks fixed in a front end of the lower frame. The front cross shaft of the inner levers carries a second set of stationary blocks fixed in a front end of the upper frame. An actuator return spring is connected between each of the links and one of the side channels of the upper frame. The first coil spring extends longitudinally of the upper frame, and the second coil spring extends longitudinally of the lower frame.

In another aspect of the invention, a jockey seat assembly is adapted to be used on a motorized vehicle. The jockey seat assembly includes a saddle seat having a substantially inverted U-shaped configuration. A height adjustment mechanism for the seat has an upper frame mounted beneath the saddle seat, a lower frame adapted to be secured to a bottom surface of the vehicle, and a collapsible lever assembly interconnected between the upper and lower frames. A biasing arrangement is secured between outermost ends of the lever assembly in the upper frame and the lower frame for urging the upper frame and the seat away from the lower frame. A pair of adjustment plates are fixed externally to the lever assembly and provided with a series of slots defining a number of vertical height adjusting positions. An actuator extends forwardly of the seat and the upper frame, and is pivotally connected to the upper frame. The actuator has a pair of links normally biased into engagement with the slots for selectively establishing a desired vertical height adjustment for the seat relative to the lower frame upon pivotal movement of the actuator. A pair of leg supports is pivotally mounted relative to a rear end of the seat on opposite sides thereof.

An adjustment means is provided for setting different rotary positions of the leg supports relative to the seat. A pair of locating plates, each being provided with a set of holes and a pivot rod, are joined to the upper frame. Each of the leg supports has a curved, padded member and a bottom end with an aperture for receiving one of the pivot rods. The bottom ends have extensions for holding spring-loaded pins engagable with any of the holes in the locating plates. The leg supports are adjustable to a first position adapted to enable a seat occupant to assume a seated position, a second position adapted to enable a seat occupant to assume a semi-standing position and a third position adapted to enable a seat occupant to assume a fully standing position.

In a further aspect of the invention, a jockey seat assembly is adapted to be used on a motorized vehicle. The jockey seat assembly includes a saddle seat having a substantially inverted U-shaped configuration. A height adjustment mechanism for the seat has an upper frame mounted beneath the saddle seat, a lower frame adapted to be secured to a bottom surface of the vehicle, and a collapsible lever assembly interconnected between the upper and lower frames. A biasing arrangement is secured between outermost ends of the lever assembly in the upper frame and the lower frame for urging the upper frame and the seat away from the lower frame. A pair of adjustment plates are fixed externally to the lever assembly and provided with a series of slots defining a number of vertical height adjusting positions. An actuator extends forwardly of the seat and the upper frame and is pivotally connected to the upper frame. The actuator has a pair of links normally biased into engagement with the slots for selectively establishing a desired vertical height adjustment for the seat relative to the lower frame upon pivotal movement of the actuator. A pair of leg supports is pivotally mounted relative to a rear end of the seat on opposite sides thereof. A handlebar assembly is attached to a front end of the upper frame, and a backrest is attached to a rear end of the upper frame.

Various other objects, features and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
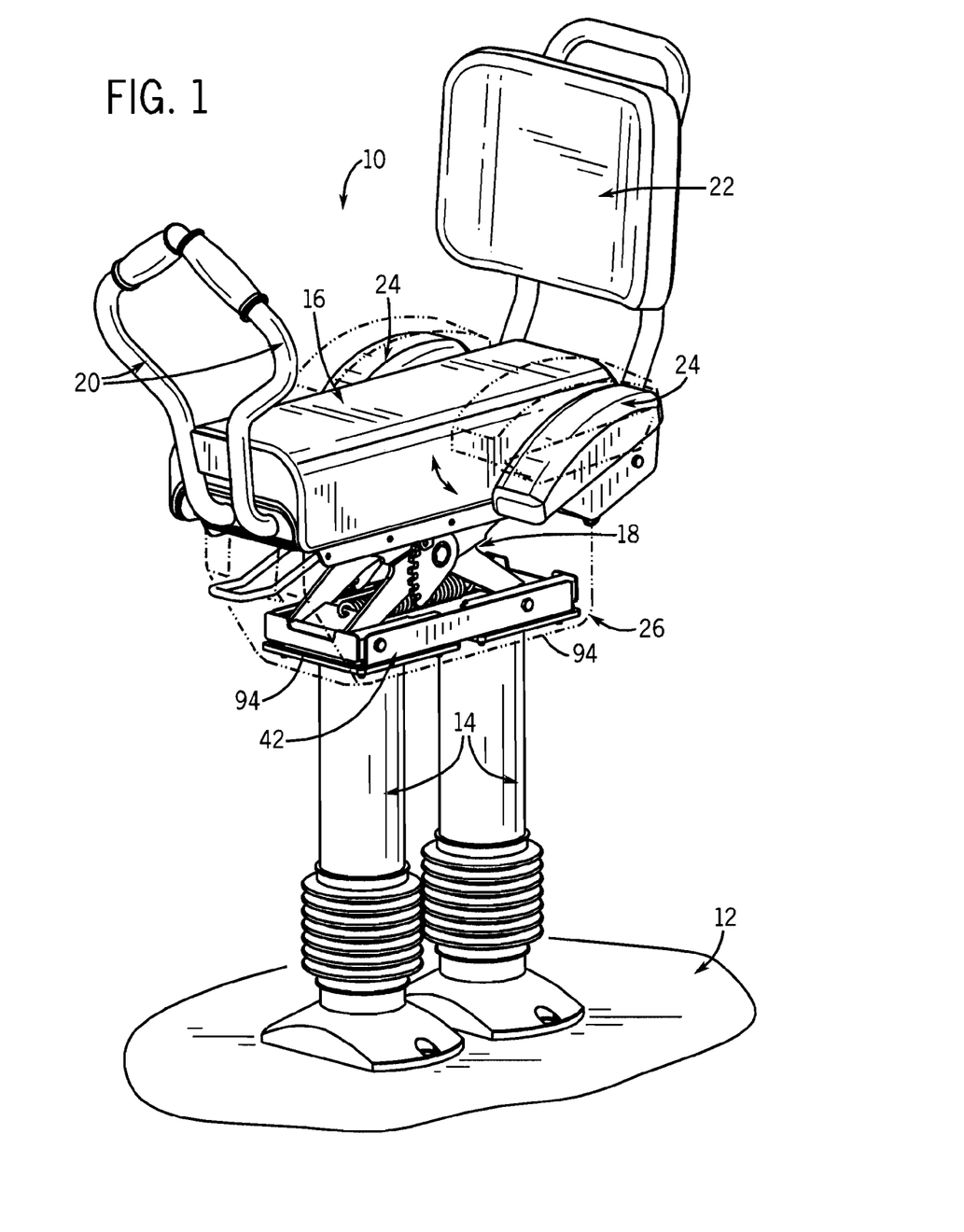
FIG. 1 is a perspective view of a jockey seat assembly as mounted on a pair of pedestals in a reinforced inflatable boat.

Referring now to the drawings, FIG. 1 illustrates a jockey or saddle seat assembly 10 embodying the present invention. In the preferred embodiment, the jockey seat assembly 10 is shown mounted to a bottom support surface of a motorized vehicle such as a reinforced, inflatable boat (RIB) 12 by a pair of support pedestals 14 which do not form part of the invention. Such pedestals 14 are commercially available items that typically can provide shock absorbing capability as desired.

The jockey seat assembly 10 is basically comprised of a saddle seat 16 and a latch bar actuated, spring assisted height adjusting mechanism 18. A pair of handlebars 20, a backrest 22 and a pair of adjustable lateral leg supports 24 may also be included in the seat assembly 10. A housing 26 (shown in phantom lines) protectively surrounds and encloses the height adjusting mechanism 18.

Figure 2:
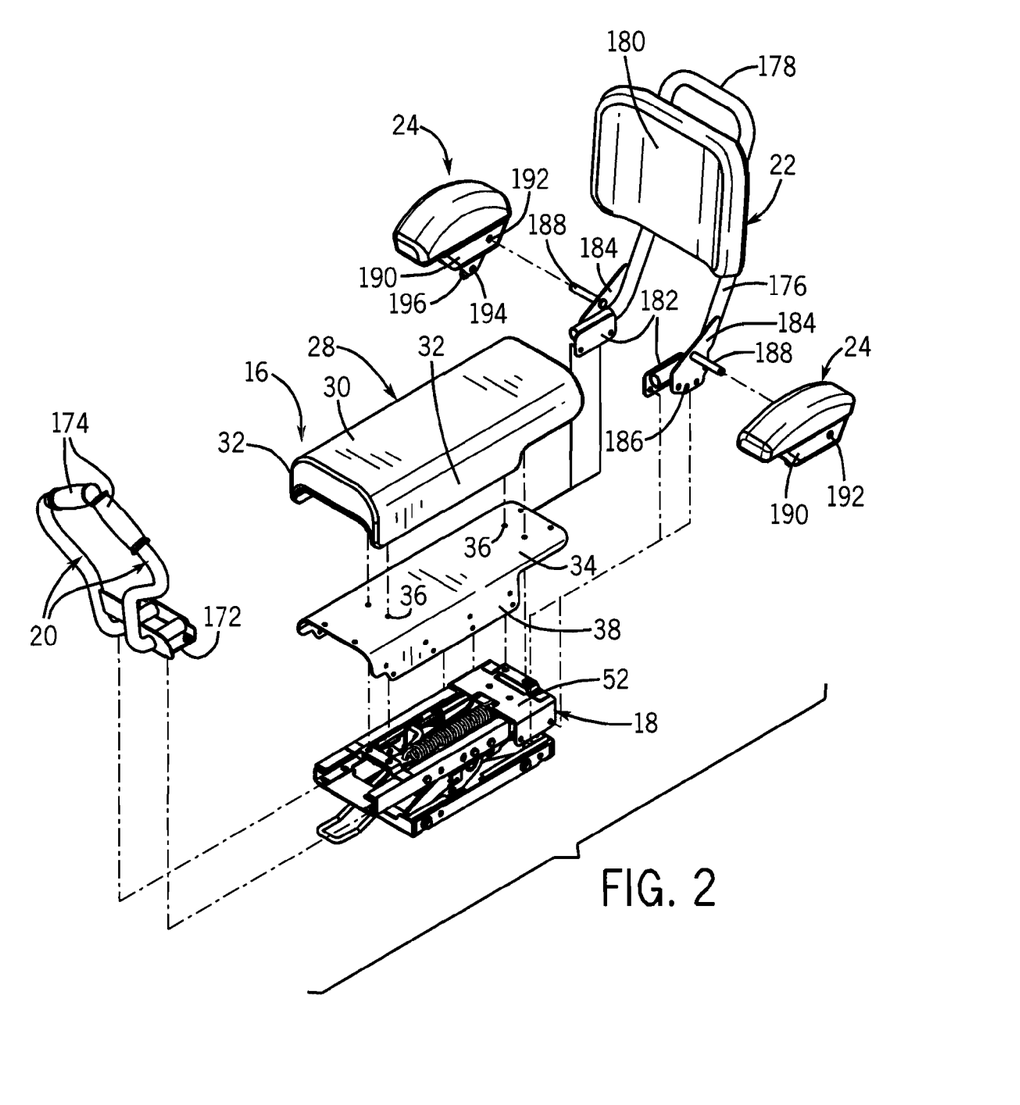
FIG. 2 is an exploded view of the jockey seat assembly shown in FIG. 1 with the pedestals removed.
Figure 3:
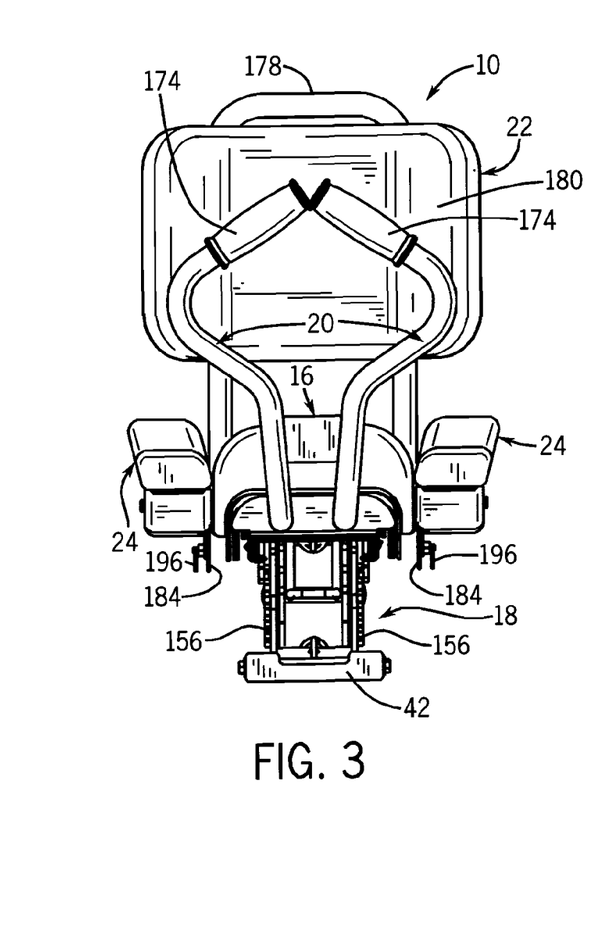
FIG. 3 is a front view of the jockey seat assembly.
Figure 4:
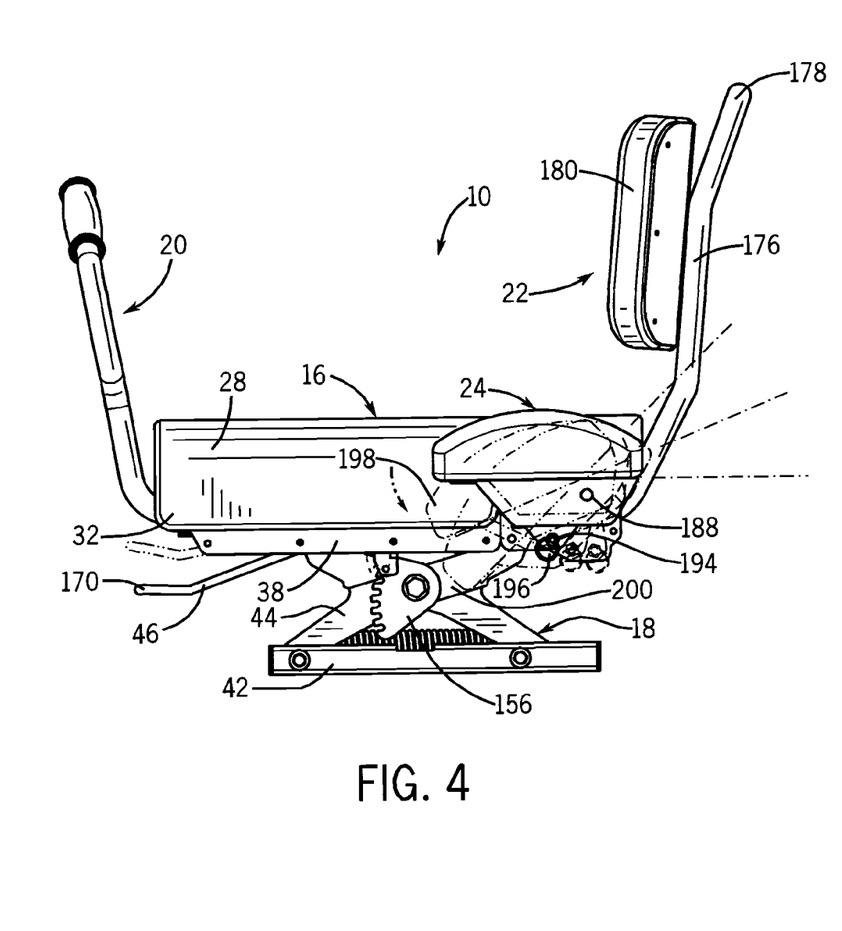
FIG. 4 is an elevated view of the jockey seat assembly taken from the right side of FIG. 3.

With further reference to FIGS. 2-4, the saddle seat 16 has a durable, elongated seat construction which is configured with a substantially inverted U-shape. The seat 16 is internally provided with a multi-density foam padding and externally with a water-resistant, vinyl cover 28. The cover 28 defines a slightly convexly rounded or curved upper surface 30 and depending vertical side surfaces 32 which support the upper, inner thighs of a person straddling the seat. The seat 16 is secured to a rigid similarly-shaped lower cushion base 34 which, in turn, is fixedly attached to the height adjusting mechanism 18 such as by conventional fasteners which are passed through holes 36. The base 34 has depending sidewalls 38 that extend downwardly beyond the side surfaces 32 of cover 28.

Figure 5:
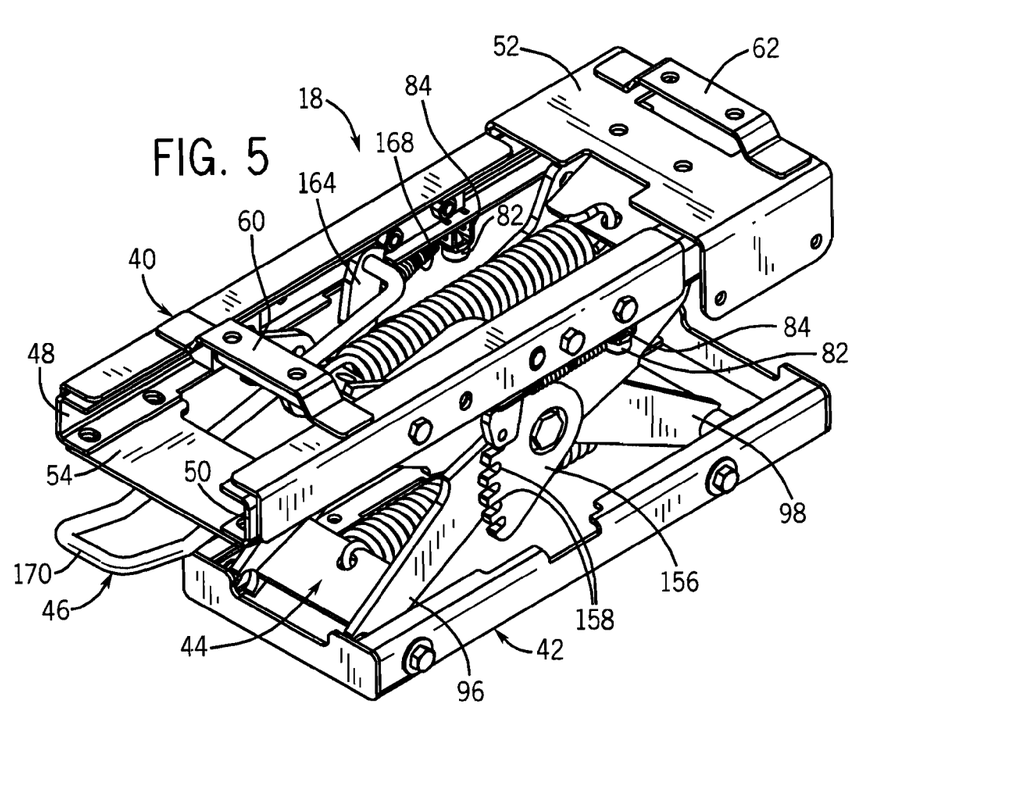
FIG. 5 is an enlarged perspective view of a height adjusting mechanism for the jockey seat assembly.
Figure 6:
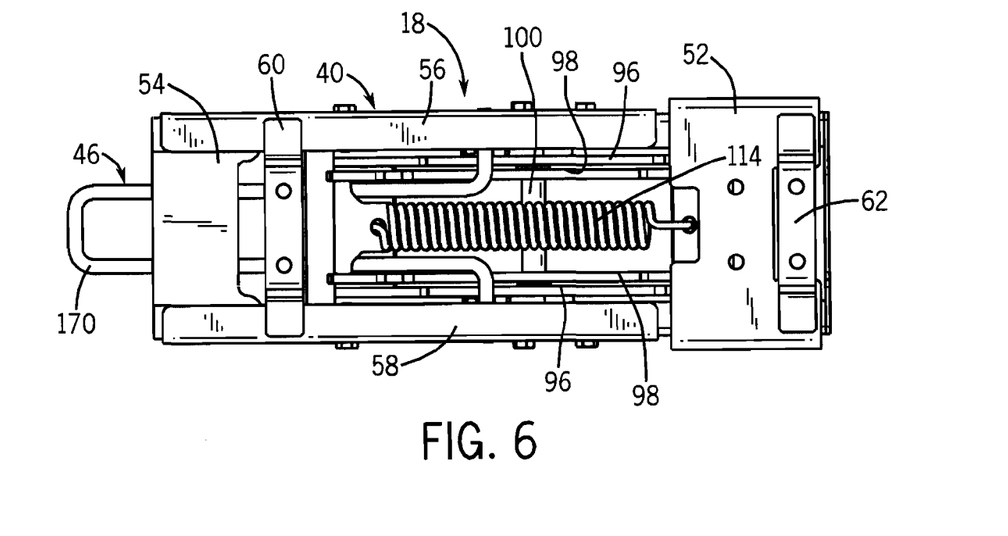
FIG. 6 is a plan view of FIG. 5.
Figure 7:
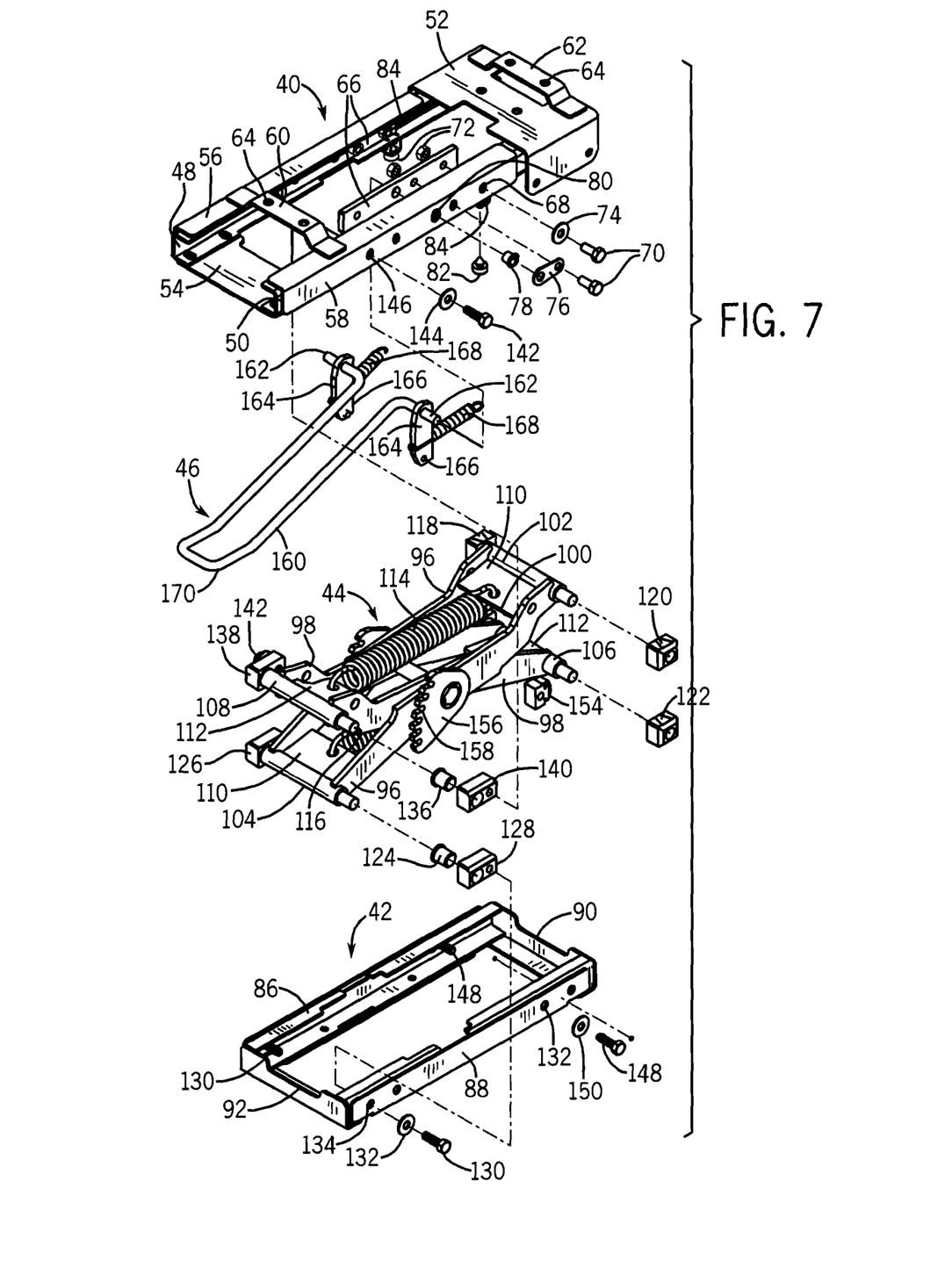
FIG. 7 is an exploded view of FIG. 5.

As seen best in FIGS. 5-7, the height adjusting mechanism 18 includes an upper frame 40, a lower frame 42, a lever assembly 44 movably interposed between the upper and lower frames 40, 42 and a latch bar or actuator 46 pivotally connected to the upper frame 40.

Upper frame 40 has a pair of spaced apart side channels 48, 50, a top rear end plate 52 and a bottom front end plate 54. A pair of reinforcing angle bars 56, 58 are positioned externally of the side members 48, 50. A front attachment strap 60 is attached transversely across the angle bars 56, 58. A rear attachment strap 62 is connected across the rear end plate 52. Both straps 60, 62 are formed with openings 64 aligned with holes 36 in base 34 to facilitate securement of seat 16 and base 34 to the height adjusting mechanism 18. A pair of reinforcing support bars 66 are placed adjacent the inside surfaces of channels 48, 50. The support bars 66, channels 48, 50 and angle bars 56, 58 are formed with aligned apertures 68, and held together by bolts 70 and nuts 72. Washers 74, 76 for the bolts 70 are provided between the channels 48, 50 and angle bars 56, 58. Holes in washer 76 are in registration with a pair of latch bar bearings 78 inserted in recesses 80 provided in channels 48, 50 and angle bars 56, 58. A set of bumpers 82 is fixed to spring mounts 84 depending from the bottom of channels 48, 50.

Lower frame 42 has a pair of spaced apart side channels 86, 88 connected together by a rear end plate 90 and a front end plate 92. As seen in FIG. 1, the pedestals 14 have mounting plates 94 at their top ends that are secured to the bottom of lower frame 42.

Upper frame 40 and lower frame 42 are connected one above the other by the lever assembly 44 formed by a pair of outer levers 96 and a pair of inner levers 98. The lever assembly 44 defines a collapsible scissors linkage in the height adjusting mechanism 18. Mid-portions of the levers 96, 98 are pivotally connected together by a pivot pin 100. Outermost ends of outer levers 96 are joined by a rear cross shaft 102 and a front cross shaft 104. Outermost ends of inner levers 98 are interconnected by a rear cross shaft 106 and a front cross shaft 108. Spring attachment plates 110 are provided between outermost ends of outer levers 96. Spring attachment plates 112 are provided between outermost ends of inner levers 98. A first coil height adjustment spring 114 is connected between plate 110 at the rear ends of outer levers 96 and the plate 112 at the front ends of inner levers 98. A second coil height adjusting spring 116 is attached between plate 112 at the rear ends of inner levers 98 and the plate 110 at the front ends of outer levers 96.

Outer ends of the cross shaft 102 are provided with slide blocks 118, 120. Outer ends of the cross shaft 106 carry slide blocks, one of which is seen at 122 (FIG. 7). Slide blocks 118, 120 are slidably received in the rear ends of the channels 48, 50 on upper frame 40. Slide blocks 122 are slidably received in the rear ends of the channels 86, 88 on lower frame 42. Outer ends of the cross shaft 104 are provided with bearings 124 and stationary blocks 126, 128 received in front ends of the channels 86, 88 on lower frame 42. The stationary blocks 126, 128 are held fixed by fasteners 130 that pass through washers 132 and holes 134 formed in the side channels 86, 88. Outer ends of the cross shaft 108 are provided with bearings 136 and stationary blocks 138, 140 received in front ends of the channels 48, 50 on upper frame 40. The stationary blocks 138, 140 are held fixed by fasteners 142 that pass through washers 144 and holes 146 formed in the side channels 48, 50 and angle bars 56, 58. Fasteners 148 pass through washers 150 and holes 152 created in rear ends of side channels 86, 88. The fasteners 148 are used to hold bumper stops 154 placed inside the side channels 86, 88. A pair of adjustment plates 156 is welded outside the outer levers 96 at the pivot pin 100. The adjustment plates 156 are formed with a series of lugs 158 that define six slots representing six different height adjustment positions for the seat 16.

Latch bar actuator 46 is an elongated rod formed into a substantially U-shaped member 160 having laterally extending projections 162 that are inserted in the bearings 78 so that actuator 46 is pivotally mounted relative to upper frame 40. Links 164 depend from the projections 162 and are provided with inwardly extending pins 166. The pins 166 are engagable with any of the slots formed in the adjustment plates 156 during height adjustment of the seat 16. Latch bar return springs 168 have forward ends that are anchored in grooves in the links 164, and rearward ends connected to the spring mounts 84 depending from upper frame 40. When the projections 162, pins 166 and springs 168 are properly positioned, a handle portion 170 of the actuator 46 extends forwardly from beneath upper frame 40 to facilitate height adjustment of the seat 16 as will be appreciated below.

Optional handlebars 20 extend upwardly from a lower end 172 (FIG. 2) that is slidably received in the front end of channels 48, 50 and secured thereto. The handlebars 20 are configured with various bends to present a pair of ergonomically located, padded hand grips 174.

Optional backrest includes a tubular frame 176 with an upper portion that serves as a handle 178 and a mounting surface for attachment of a covered padded cushion 180. The framework 176 also has a lower portion with mounting plates 182 that are attached by suitable fasteners to sidewalls of the rear plate 52 on upper frame 40 as best seen in FIG. 2. The mounting plates 182 are joined to inside surfaces of locating plates 184 that are used to mount the leg supports 24. Each locating plate 184 has a set of holes 186 along its bottom edge for enabling a three-position adjustment of the leg supports 24, and a rod 188 for permitting pivotal mounting of the leg supports 24 thereon.

Optional leg supports 24 may be provided for selective pivotal adjustment on both sides of the jockey seat assembly 10 to better accommodate the particular seated, standing or semi-standing position of the seat occupant. Each leg support 24 is a vinyl covered, cushioned, seamless member formed with an upper curved contour to comfortably support the upper thighs of the seat occupant. The leg supports 24 include rigid bottom ends 190 with apertures 192 for receiving the rods 188 so that the leg supports 24 are pivotally mounted relative to the locating plates 184 on backrest frame 176. The bottom ends 190 have extensions for holding spring-Loaded release pins 194 with retaining rings 196 such that the pins 194 are selectively engaged with any of the holes 186 in locating plates 184. The holes 186 are created so as to provide pivotal adjustment in 23-degree increments so that each leg support 24 may assume a seated position (shown in full lines of FIG. 4), a combination seated-standing position (shown in phantom lines 198) or a standing position (shown in phantom lines 200).

Although not illustrated, the invention contemplates an alternative mounting arrangement for the lateral supports 24 when the backrest 22 and framework 176 are not included. A set of locating plates 184 with holes 186 and rods 188 may instead be attached to the rear end of the upper frame 40.

All components of the jockey seat assembly 10 are constructed with corrosion-resistant coating and materials designed specifically for the marine environment.

In use, lever springs 114, 116 are installed with a predetermined force which normally urges the upper frame 40 and unoccupied seat 16 away from the lower frame 42, and prevents upper frame 40 from collapsing on lower frame 42. Latch bar springs 168 are biased to normally retain or lock pins 166 in selected slots of the adjustment plate 156 so as to maintain seat 16 in a desired vertical height position. In the preferred embodiment, the seat 16 may be adjusted to six discrete height positions and offers a total of four inches in height variation from a fully raised position shown in FIGS. 1, 4 and 5 to a fully lowered position (not shown).

To adjust the seat height from the fully raised position, a seat occupant straddling seat 16 raises oneself therefrom and pulls upwardly on and holds actuator handle 170 moving the actuator 46 from the full line position to the phantom line position in FIG. 4. This releases the pins 166 from their locking engagement in the uppermost slots of adjustment plates 156. The seat occupant then applies his/her weight on seat 16 which begins to collapse the lever assembly 18 against the force of springs 114, 116. When the desired lower position is attained, the handle 170 is released so that the springs 168 will return pins 166 to the lock position in the appropriate slots of adjustment plate 156.

It should be appreciated that during height adjustment, the slide blocks 120, 122 of the lever assembly 18 are sliding in the rear ends of the upper frame 40 and the lower frame 42. When the seat 16 is in the fully raised position, the slide blocks 122 engage the bumper stops 154 in the rear ends of lower frame 42. When the seat 16 is in the lowermost position, the bumpers 82 on upper frame 40 will engage the bumper stops 154 on the lower frame 42 to provide a cushioning stop. The seat 16 may always be adjusted in height by simply pulling upwardly on the handle 170 to release pins 166 from their locking engagement with adjustment plates 156, after which the scissors linkage 18 translates to a desired height adjustment that is retained by releasing the handle 170 and allowing the pins 166 to lockingly re-engage the shifted adjustment plates 156.

To adjust the optional leg supports 24, the pins 194 are inserted in any one of the three positions defined by the holes 186 in locating plates 184 as depicted in FIG. 4. The adjustable leg supports 24 provide a greater level of comfort and support for the occupant straddling seat 16 whether he/she is in a fully seated position, a semi-standing position or a fully standing position.

Further support and stability for the seat occupant is attained by employing the optional backrest 22 and the optional handlebars 20.

The present invention thus provides a jockey seat assembly having enhanced comfort and support features particularly desired in high-speed marine applications. The jockey seat assembly employs a single actuator, lever-type, spring-assisted height adjusting mechanism protectively enclosed by a housing. The jockey seat assembly may further include a pair of optional adjustable lateral leg supports for improving the ride of the seat occupant as well as optional handlebars and backrest structure for improving occupant support.

While the invention has been described with reference to a preferred embodiment, those skilled in the art will appreciate that certain substitutions, alterations and omissions may be made without departing from the spirit thereof. For example, the jockey seat assembly may be used in other motorized vehicles, besides marine vehicles. Accordingly, the foregoing description is meant to be exemplary only and should not be deemed limitative on the scope of the invention set forth with the following claims.

We claim:

1. A jockey seat assembly adapted to be used on a motorized vehicle, the jockey seat assembly comprising:
   a saddle seat having a substantially inverted U-shaped configuration; and
   a height adjusting mechanism for the seat having an upper frame mounted beneath the saddle seat, a lower frame adapted to be secured to a bottom surface of the vehicle, a collapsible lever assembly interconnected between the upper and lower frames, a biasing arrangement secured between outermost ends of the lever assembly in the upper frame and the lower frame for urging the upper frame and the seat away from the lower frame, a pair of separate adjustment plates fixed externally to lateral surfaces of the lever assembly and provided with a series of slots defining a number of vertical height adjusting positions, and an actuator extending forwardly of the seat and the upper frame, and pivotally connected to the upper frame, the actuator being directly connected to a pair of links normally biased into engagement with the slots by return springs extending between the links and the upper frame for selectively establishing a desired vertical height adjustment for the seat relative to the lower frame upon pivotal movement of the actuator;
   wherein the lever assembly includes a pair of outer levers and a pair of inner levers pivotally connected together at respective mid-portions thereof, each of the levers being comprised of a single, one piece member; and
   wherein the biasing arrangement includes a first biasing element having front and rear ends secured in and positioned longitudinally in the upper frame, and a second biasing element having front and rear ends secured in and positioned longitudinally in the lower frame.

2. The jockey seat assembly of claim 1, wherein the upper frame includes a pair of side channels, and the lower frame includes a pair of side channels.

3. The jockey seat assembly of claim 1, wherein outermost ends of the outer levers are joined by a rear cross shaft and a front cross shaft.

4. The jockey seat assembly of claim 3, wherein outermost ends of the inner levers are interconnected by a rear cross shaft and a front cross shaft.

5. The jockey seat assembly of claim 4, wherein the biasing arrangement includes a first coil spring secured between the rear cross shaft of the outer levers and the front cross shaft of the inner levers.

6. The jockey seat assembly of claim 5, wherein the biasing arrangement includes a second coil spring connected between the rear cross shaft of the inner levers and the front cross shaft of the outer levers.

7. The jockey seat assembly of claim 6, wherein the rear cross shaft of the outer levers carries a first set of slide blocks that are slidably received in a rear end of the upper frame.

8. The jockey seat assembly of claim 7, wherein the rear cross shaft of the inner levers carries a second set of slide blocks slidably received in a rear end of the lower frame.

9. The jockey seat assembly of claim 8, wherein the front cross shaft of the outer levers carries a first set of stationary blocks fixed in a front end of the lower frame.

10. The jockey seat assembly of claim 9, wherein the front cross shaft of the inner levers carries a second set of stationary blocks fixed in a front end of the upper frame.

11. A jockey seat assembly adapted to be used on a motorized vehicle, the jockey seat assembly comprising:
    a saddle seat having a substantially inverted U-shaped configuration;
    a height adjusting mechanism for the seat having an upper frame mounted beneath the saddle seat, a lower frame adapted to be secured to a bottom surface of the vehicle, a collapsible lever assembly interconnected between the upper and lower frames, a biasing arrangement secured between outermost ends of the lever assembly in the upper frame and the lower frame for urging the upper frame and the seat away from the lower frame, a pair of adjustment plates fixed externally to the lever assembly and provided with a series of slots defining a number of vertical height adjusting positions, and an actuator extending forwardly of the seat and the upper frame, and pivotally connected to the upper frame, the actuator having a pair of links normally biased into engagement with the slots for selectively establishing a desired vertical height adjustment for the seat relative to the lower frame upon pivotal movement of the actuator; and
    a pair of leg supports pivotally mounted relative to a rear end of the seat on opposite sides thereof.

12. The jockey seat assembly of claim 11, including adjustment means for selling different rotary positions of the leg supports relative to the seat.

13. The jockey seat assembly of claim 11, wherein a pair of locating plates, each being provided with a set of holes and a pivot rod, are joined to the upper frame.

14. The jockey seat assembly of claim 13, wherein each of the leg supports has a curved padded member and a bottom end with an aperture for receiving one of the pivot rods.

15. The jockey seat assembly of claim 14, wherein the bottom ends have extensions for holding spring loaded pins engagable with any of the holes and the locating plates.

16. The jockey seat assembly of claim 11, wherein the leg supports are adjustable to a first position adapted to enable a seat occupant to assume a seated position, a second position adapted to enable a seat occupant to assume a semi-standing position and a third position adapted to enable a seat occupant to assume a fully standing position.

17. A jockey seat assembly adapted to be used on a motorized vehicle, the jockey seat assembly comprising:
    a saddle seat having a substantially inverted U-shaped configuration;
    a height adjusting mechanism for the seat having an upper frame mounted beneath the saddle seat, a lower frame adapted to be secured to a bottom surface of the vehicle, a collapsible lever assembly interconnected between the upper and lower frames, a biasing arrangement secured between outermost ends of the lever assembly in the upper frame and the lower frame for urging the upper frame and the seat away from the lower frame, a pair of adjustment plates fixed externally to the lever assembly and provided with a series of slots defining a number of vertical height adjusting positions, and an actuator extending forwardly of the seat and the upper frame, and pivotally connected to the upper frame, the actuator having a pair of links normally biased into engagement with the slots for selectively establishing a desired vertical height adjustment for the seat relative to the lower frame upon pivotal movement of the actuator;
    a pair of leg supports pivotally mounted relative to a rear end of the seat on opposite sides thereof;

a handlebar assembly attached to a front end of the upper frame; and a backrest attached to the rear end of the upper frame.

18. A jockey seat assembly adapted to be used on a motorized vehicle, the jockey seat assembly comprising:

a saddle seat having a substantially inverted U-shaped configuration; and a height adjusting mechanism for the seat having an upper frame mounted beneath the saddle seat, a lower frame adapted to be secured to a bottom surface of the vehicle, a collapsible lever assembly interconnected between the upper and lower frames, a biasing arrangement secured between outermost ends of the lever assembly in the upper frame and the lower frame for urging the upper frame and the seat away from the lower frame, a pair of adjustment plates fixed externally to the lever assembly and provided with a series of slots defining a number of vertical height adjusting positions, and an actuator extending forwardly of the seat and the upper frame, and pivotally connected to the upper frame, the actuator having a pair of links normally biased into engagement with the slots for selectively establishing a desired vertical height adjustment for the seat relative to the lower frame upon pivotal movement of the actuator, wherein the upper frame includes a pair of side channels, and the lower frame includes a pair of side channels, wherein the lever assembly includes a pair of outer levers and a pair of inner levers, a mid-portion of each of the outer levers being pivotally connected to a mid-portion of the inner levers, wherein outermost ends of the outer levers are joined by a rear cross shaft and a front cross shaft, wherein outermost ends of the inner levers are interconnected by a rear cross shaft and a front cross shaft, wherein the biasing arrangement includes a first coil spring secured between the rear cross shaft of the outer levers and the front cross shaft of the inner levers, and wherein the biasing arrangement includes a second coil spring connected between the rear cross shaft of the inner levers and the front cross shaft of the outer levers.

* * * * *